Oct. 22, 1974    L. C. ZONKER ET AL    3,843,338
GASEOUS FUEL CARBURETOR INCLUDING IMPROVED
METERING AND DISTRIBUTION SYSTEMS
Filed Dec. 8, 1972    2 Sheets-Sheet 1

Oct. 22, 1974

L. C. ZONKER ET AL 3,843,338
GASEOUS FUEL CARBURETOR INCLUDING IMPROVED
METERING AND DISTRIBUTION SYSTEMS

Filed Dec. 8, 1972

United States Patent Office 3,843,338
Patented Oct. 22, 1974

3,843,338
GASEOUS FUEL CARBURETOR INCLUDING IMPROVED METERING AND DISTRIBUTION SYSTEMS
Lawrence C. Zonker, Los Angeles, and Ervin F. Jensen, Santa Monica, Calif., assignors to Beam Products Manufacturing Company, Los Angeles, Calif.
Filed Dec. 8, 1972, Ser. No. 313,471
Int. Cl. F02m 21/02
U.S. Cl. 48—180 C                12 Claims

ABSTRACT OF THE DISCLOSURE

An inlet fuel metering chamber receives gaseous fuel from a fuel inlet and is separated from a venturi fuel inlet chamber by a selectively removable fuel metering plate. Fixed main and auxiliary fuel orifices are formed through the fuel metering plate between the two chambers and the auxiliary orifice is maintained closed at engine idle or cruising fuel demands and opened at higher acceleration and high speed fuel demands automatically by a manifold vacuum sensitive control valve. The venturi fuel inlet chamber is annular surrounding the venturi and extending a major portion of the venturi length supplying fuel to a series of equally circumferentially spaced fuel nozzles into the venturi throat.

BACKGROUND OF THE INVENTION

This invention relates to a gaseous fuel carburetor which includes one or both of an improved system for metering gaseous fuel through main and auxiliary fuel orifices thereof, and an improved system for distributing metered gaseous fuel to a venturi of the carburetor. More particularly, the invention relates to an improved gaseous fuel metering system wherein the gaseous fuel is metered through a permanently open main fuel orifice and an auxiliary fuel orifice closed under engine normal fuel demands and open under engine high fuel demands with the orifices formed through a partition of the carburetor body for maximum exactness and ease of control. Furthermore, the improved distribution system includes an annular venturi fuel inlet chamber surrounding the venturi and preferably extending a major portion of the venturi axial length communicating directly into the fuel nozzles at the venturi throat area so as to provide a ready supply of fuel capable of meeting any venturi and engine demands.

In the earlier forms of gaseous fuel carburetors such as petroleum gas carburetors and the like, the gaseous fuel was supplied to the venturi of the carburetor merely through a needle valve controlled fuel line to the fuel nozzles of the venturi. The needle valve was normally set for permitting the flow of gaseous fuel therethrough sufficient to supply the normal idle and crusing engine demands so that upon a higher demand being required, such as acceleration and high engine speed, the engine was partially starved and would not function properly. Thus, it was necessary to determine a compromise somewhere between normal and high engine fuel demands for the needle valve setting resulting in the engine being oversupplied under normal engine operating conditions and undersupplied during high fuel requirement conditions which is obviously unsatisfactory.

With these difficulties in mind, the gaseous fuel carburetors were improved by providing, in addition to the main, needle valve controlled fuel line, an auxiliary fuel line controlled by a valve sensitive to engine manifold vacuum, the valve closing the auxiliary fuel line under normal fuel load conditions and opening the same for a supplementary additional supply under high fuel load conditions. Although this improved form of carburetor has operated more nearly for properly supplying the correct fuel requirements under the changing engine load conditions, these carburetors have still not been totally satisfactory in that it has been difficult to form the fuel line openings of the exact desired sizes. Also, even with the auxiliary fuel supply for augmenting the main fuel supply under the high demand conditions, if these high demand conditions persist more than momentarily, the fuel supplies through the main and auxiliary fuel lines may still not be sufficient to satisfy the engine demands which can result in erratic and unsatisfactory performance.

For instance, if the high engine fuel demand is only momentary, the opening of the valve controlling the auxiliary fuel line and a given increased quantity of fuel supplied thereby may be sufficient to meet this momentary increased demand. If, however, the increased demand persists over an extended period of time such as would be caused by a lengthy period of engine acceleration or a lengthy period of heavy working engine use, this same increased quantity of fuel from the auxiliary fuel line even though supplied over this extended period of time may not be sufficient. In other words, unless some other provision is made, there again results a compromise situation, an auxiliary fuel line of sufficient size so that when opened will properly supply sufficient increased fuel for taking care of the extended period high demand situations which when only opened momentarily for the momentary higher demand situations will provide an excess of fuel over that required resulting in fuel waste and inefficiency.

OBJECTS AND SUMMARY OF THE INVENTION

It is, therefore, an object of this invention to provide a gaseous fuel carburetor including one or both of an improved fuel metering system and an improved fuel distribution system and which solves the problems of the prior constructions. With the fuel metering system of the present invention, a main fuel orifice is properly and correctly opened at all times metering the main gaseous fuel flow to the carburetor venturi, and an auxiliary fuel orifice is controlled for intermittent opening directly related to engine fuel demands so that additional gaseous fuel is correctly supplied to the venturi and ultimately the engine when necessary, but otherwise this increased gaseous fuel flow is terminated so that the engine operates at maximum efficiency throughout the use thereof. Furthermore, with the fuel distribution system of the present invention, particular provisions are made to maintain a relatively large reserve of gaseous fuel at all times for the carburetor venturi so that there is never an occasion of fuel supply starving and there is always a ready reserve to meet the increased demands therefor.

It is a further object of this invention to provide a gaseous fuel carburetor of the foregoing general character wherein the gaseous fuel entering the carburetor and being metered to the venturi thereof is metered through an improved orifice structure providing more exact and precise metering control than has heretofore been possible with the prior constructions. According to the fuel metering system improvements, the main and auxiliary fuel orifices are formed in partition of the carburetor body, and in the preferred form such partition is comprised of a removable orifice plate such that the orifices may be exactly and precisely formed and are not dependent on usual, less accurate molding procedures, even with later machining, which will not produce the necessary desired orifice size and flow characteristics. Furthermore, with these precisely formed orifices either merely in a carburetor body partition or the preferred removable orifice plate, in the preferred form of the present invention, an inlet fuel metering or supply chamber directly supplies the orifices with an increased ready reserve of gaseous fuel so that the fuel flow through the orifices and to the carburetor venturi is always completely predictable and will never vary from that intended.

It is still a further object of this invention to provide a gaseous fuel carburetor of the foregoing general character wherein with the distribution system for the gaseous fuel as included in the present invention, a full and increased ready reserve supply is always provided for the carburetor venturi between the particular fuel metering system and such venturi. Not only is the gaseous fuel properly directed to the fuel nozzles of the carburetor venturi for an even supply of gaseous fuel into such venturi, but a complete and oversize ready reserve is provided from the chamber annularly surrounding the venturi and the fuel nozzles thereof so that as the engine fuel demands are quickly increased for engine acceleration and other high demand operations, sufficient gaseous fuel will always be available to the venturi fuel nozzles and there can never be an incidence of engine fuel starvation. In the preferred form, not only does the venturi fuel inlet chamber which must supply the venturi fuel nozzles extend of maximum size directly outwardly from the venturi fuel nozzles, but said chamber likewise extends axially of the venturi a major portion thereof so as to include the necessary ready reserve for increased engine fuel demands.

It is an additional object of this invention to provide a gaseous fuel carburetor which may include all of the foregoing advantageous structure in a relatively simplified carburetor body, yet which carburetor is capable of meeting all of modern present and future emission control standards vital for the reduction of atmospheric pollutants presently being caused by internal combustion engines. With the preferred form of carburetor according to the principles of the present invention, the selectively removable metering orifice plate may be conveniently originally adapted, or if necessary, quickly replaced, to meet the exact requirements of the particular carburetor supplying the particular engine so as to ensure the maximum possible efficiency of operation and reduce to a minimum one of the obviously major factors of pollutant causation. Furthermore, again in the preferred form, the main and auxiliary fuel orifices in the orifice plate are completely preset and nonadjustable which means that once the most efficient orifice size has been determined to meet the particular carburetor and engine requirements, this orifice size is completely preset and not capable of adjustment which can destroy the proper metering qualities thereof.

Other objects and advantages of the invention will be apparent from the following specification and the accompanying drawings which are for the purpose of illustration only.

DESCRIPTION OF THE BEST EMBODIMENT CONTEMPLATED

Figure 1:
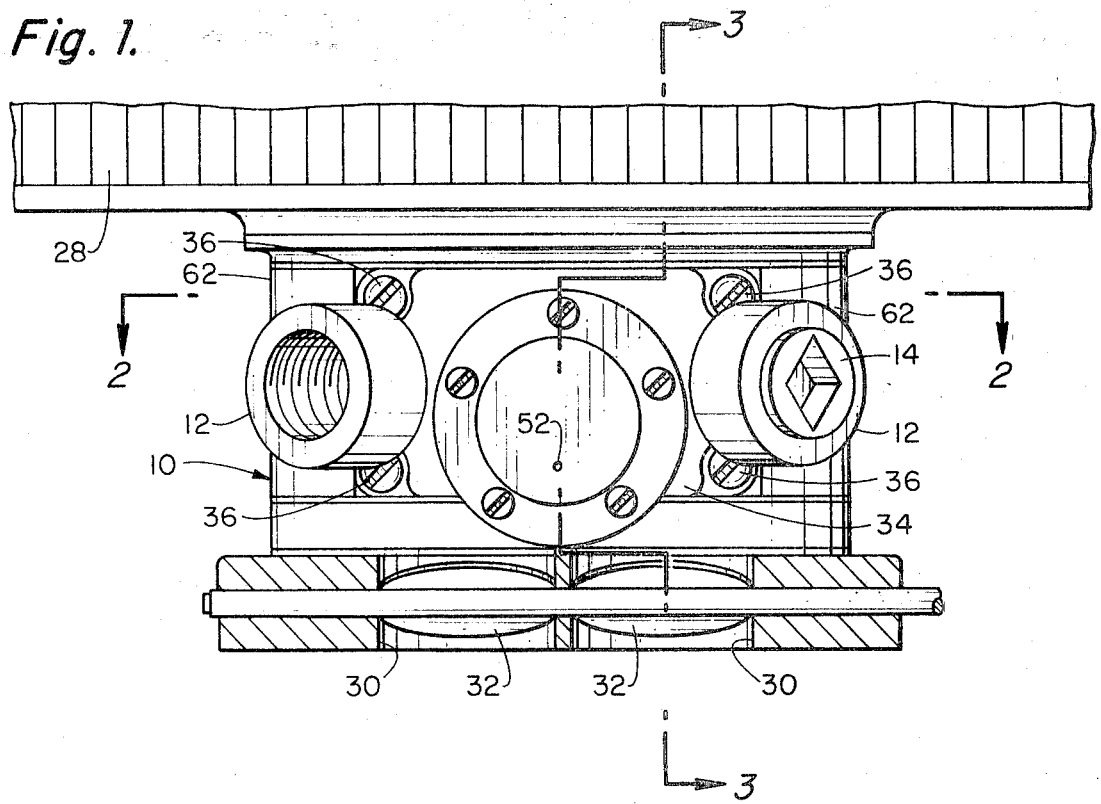
FIG. 1 is a fragmentary, side elevational view, part in vertical section, of a gaseous fuel carburetor incorporating the principles of the present invention.

Referring to the drawings, an embodiment of a gaseous fuel carburetor is illustrated therein incorporating both the fuel metering system improvements and the fuel distribution system improvements of the present invention. The particular gaseous fuel carburetor illustrated is of the double venturi form and it is well known to those skilled in the art, as will be readily apparent from the following description, that the same inventive principles are applicable whether the carburetor is of the single, double or four venturi form, the double venturi carburetor merely being chosen for the present purposes of description. Furthermore, it is well known that similar carburetors may be used for various types of gaseous fuels, for instance, petroleum gas, natural gas, sewer gas and swamp gas. Thus, in the following description, a specific preferred form of applying the principles of the present invention is described, but by such description, it is not intended to limit the principles of the present invention to the exact structure shown.

The particular carburetor illustrated includes a main carburetor body generally indicated at 10 enclosing the various carburetor components to be hereinafter described, the various components including this main body being formed of usual materials and in the usual manner except as hereinafter specifically pointed out. The main body 10 encloses and/or mounts alternate gaseous fuel inlets 12, one of which is shown in FIG. 1 closed by a plug 14 since one is sufficient for fully supplying gaseous fuel to the carburetor even though alternates are provided for convenience in adapting the carburetor to a particular fuel system and engine, in some cases both gaseous fuel inlets being used. In a typical liquefied petroleum gas supply system, compressed liquefied petroleum gas is supplied from a storage tank or tanks (not shown) through a regulator (not shown) which expands the liquid gas and reduces the pressure thereof to ultimately direct resulting gaseous fuel to one of the gaseous fuel inlets 12 of the carburetor. Thus, when the fuel reaches the particular gaseous fuel inlet 12, of the carburetor, it is in gaseous form.

Both of the gaseous fuel inlets 12 communicate inwardly into an inlet fuel metering chamber generally indicated at 16 which contains centrally thereof a vacuum actuated control valve generally indicated at 18 and is separated within the main body 10 from substantially identical venturi fuel inlet chambers generally indicated at 20 by preferably a single fuel metering plate 22, the latter forming a rigid partition within the main body. Each of the venturi fuel inlet chambers 20 surround in a manner to be hereinafter described more in detail a venturi 24 of somewhat usual formation for functioning in the usual manner well known to those skilled in the art. A venturi air inlet 26 opens upawrdly into and in communication with a usual air cleaner or filter 28 from each of the venturis 24 and each of the venturis opens downwardly through a venturi air-fuel outlet 30 which contains a usual butterfly valve 32 pivotly operable in the usual manner. As shown, the carburetor main body 10 is flanged at the lower portion thereof surrounding the venturi air-fuel outlets 30 for securement of the carburetor with the venturi air-fuel outlets in communication with the usual intake manifold system (not shown) of a petroleum gas consuming engine (not shown).

Figure 2:
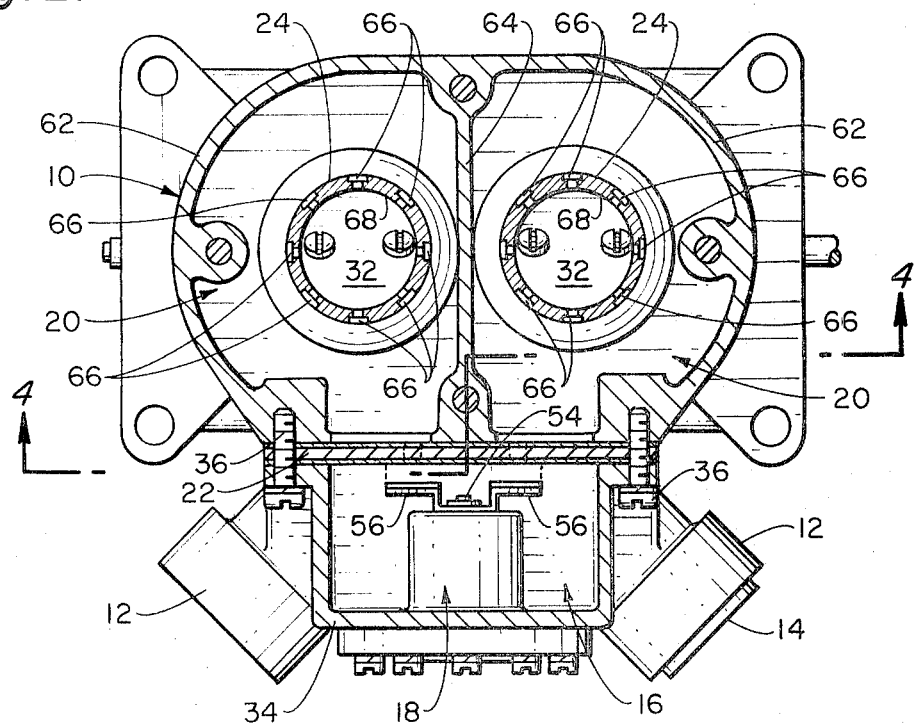
FIG. 2 is a horizontal sectional view looking in the direction of the arrows 2—2 in FIG. 1.

The inlet fuel metering chamber 16 is fully opened to the particular relatively large goseous fuel inlet 12 supplying the same and is relatively spacious both horizontally and vertically so as to define a volume far greater than that required merely for the passage of gaseous fuel therethrough. As can be particularly seen in FIGS. 2 and 3, the inlet fuel metering chamber 16 is open to the fuel metering plate 22 over the entire surface of the fuel metering plate except for a border portion required for cover 34 forming the inlet fuel metering chamber to be secured to the remainder of the carburetor main body 10. Furthermore, the fuel metering plate 22 is clamped between this cover 34, the assembly being secured by usual selectively removable fasteners 36 so as to mount the fuel metering plate selectively removable and replaceable or alterable.

The fuel metering plate 22 is formed with identically sized, fixed, main fuel orifices 38 therethrough, one aligned with and communicating from the inlet fuel metering chamber 16 into each of the separate venturi fuel inlet chambers 20. Spaced downwardly from the main fuel orifices 38, the fuel metering plate 22 is formed with a pair of, in this case, smaller identically sized and fixed auxiliary fuel orifices 40, one communicating between the inlet fuel metering chamber 16 and each of the separate venturi fuel inlet chambers 20. The sizes of these auxiliary fuel orifices 40 could be the same as, larger or smaller than the main fuel orifices 38, depending on the particular fuel, carburetor and engine applications. Near a lower edge thereof, the fuel metering plate 22 is formed with a single elongated vacuum opening 42 therethrough which is spaced below communication with any of the inlet fuel metering chamber 16 and venturi fuel inlet chambers 20 aligned with a lower wall of the cover 34 for a purpose to be hereinafter described. For present considerations, it is seen that the main and auxiliary fuel orifices 38 and 40 are free of any size adjustment so as to be, as described, fixed size and the opening areas of the fuel metering plate 22 formed by all of these orifices combined is extremely small compared to the overall size of the inlet fuel metering chamber 16.

The fuel metering plate 22, being an important component of the preferred construction and application of the principles of the present invention, is preferably formed as merely a flat plate comprised of a central core of sheet aluminum with a layer of hard gasket material at either side. Furthermore, these materials of the fuel metering plate 22 are such so as to maintain the various main and auxiliary fuel orifices 38 and 40 possible of exact formation and will thereafter maintain their fixed sizes during use. It is preferred to form the two main fuel orifices 38 horizontally aligned and the two auxiliary fuel orifices 40 spaced therebelow and horizontally aligned, the latter being the more important as will be hereinafter pointed out.

Figure 3:
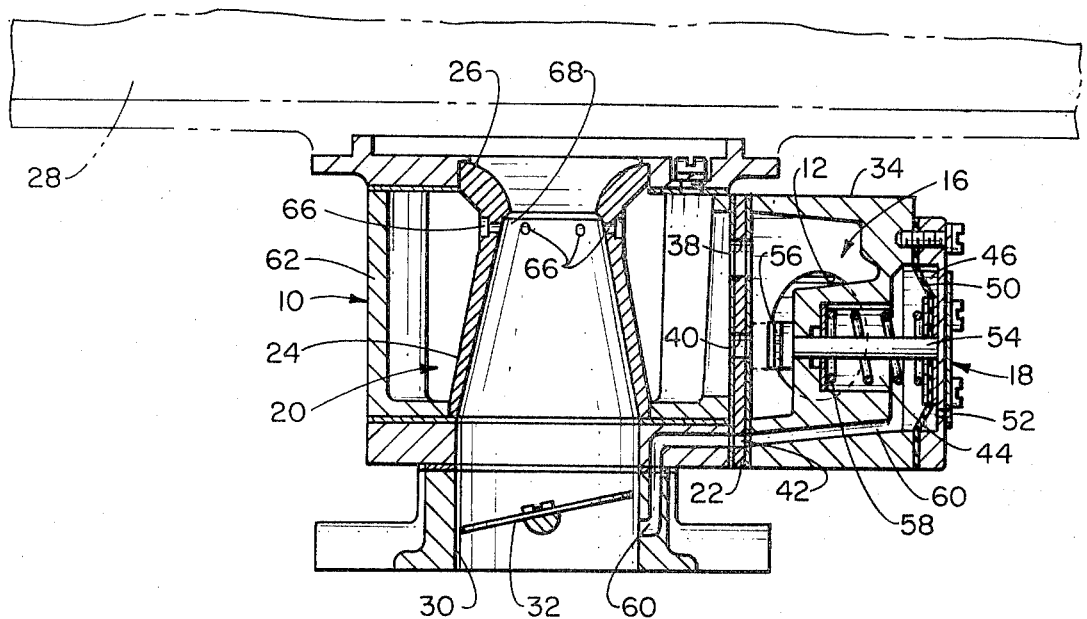
FIG. 3 is a vertical sectional view with the carburetor air cleaner removed and partially shown in phantom lines looking in the direction of the arrows 3—3 in FIG. 1.

The vacuum actuated control valve 18 is mounted on the main body 10 within the inlet fuel metering chamber 16 and as best seen in FIG. 3 incldes a vacuum chamber 44 rearwardly separated from a free air chamber 46 by a flexible diaphragm 50, the free air chamber being vented to the outside atmosphere through an air vent 52. Secured to and movable with the flexible diaphragm 50 is a forwardly projecting plunger 54 which projects forwardly through the vacuum chamber 44 and forwardly from such chamber where the plunger is secured to a preferably neopene plastic covered valve plate 56 rearwardly aligned with the auxiliary fuel orifices 40 of the fuel metering plate 22. A rearwardly activated coil control spring 58 surrounds the plunger 54 within the vacuum chamber 44 bearing rearwardly against the central portion of the flexible diaphragm 50, the control spring being carefully selected for exerting a determined rearward force rearwardly against the diaphragm 50 as will be hereinafter fully explained.

Thus, with no vacuum or a vacuum less than that required to overcome the rearward urging of the control spring 58 within the vacuum chamber 44, the control spring will maintain the flexible diaphragm 50 urged rearwardly drawing the plunger 54 and valve plate 56 rearwardly with the valve plate spaced rearwardly of the auxiliary fuel orifices 40 in the fuel metering plate 22 so as to open these auxiliary fuel orifices as shown in FIG. 3. When, however, a vacuum within the vacuum chamber 44 is applied exerting a sufficient vacuum against the flexible diaphragm 50 to overcome the rearward urging force of the control spring 58, the flexible diaphragm 50 will move forwardly carrying the plunger 54 and valve plate 56 forwardly until the valve plate contacts the fuel metering plate 22 over and covering both of the auxiliary fuel orifices 40 to maintain the same closed. The vacuum control of this vacuum actuated control valve 18 is provided by a vacuum line or passage 60 through the carburetor main body 10 opening into the vacuum chamber 44 of the vacuum actuated control valve 18 at one end and opening into the venturi air-fuel outlet 30 below the butterfly valve 32 at the other end. In this manner, the vacuum line 60 and therefore, the vacuum actuated control valve 18 receive and sense vacuum from the manifold system of the engine upon which the carburetor is installed, the control spring 58 of the vacuum actuated control valve 18 being selected to retain the auxiliary fuel orifices 40 closed during the high manifold vacuum of engine idle or cruising speeds and to open the auxiliary fuel orifices during the low manifold vacuum engine acceleration and engine high loads.

Figure 4:
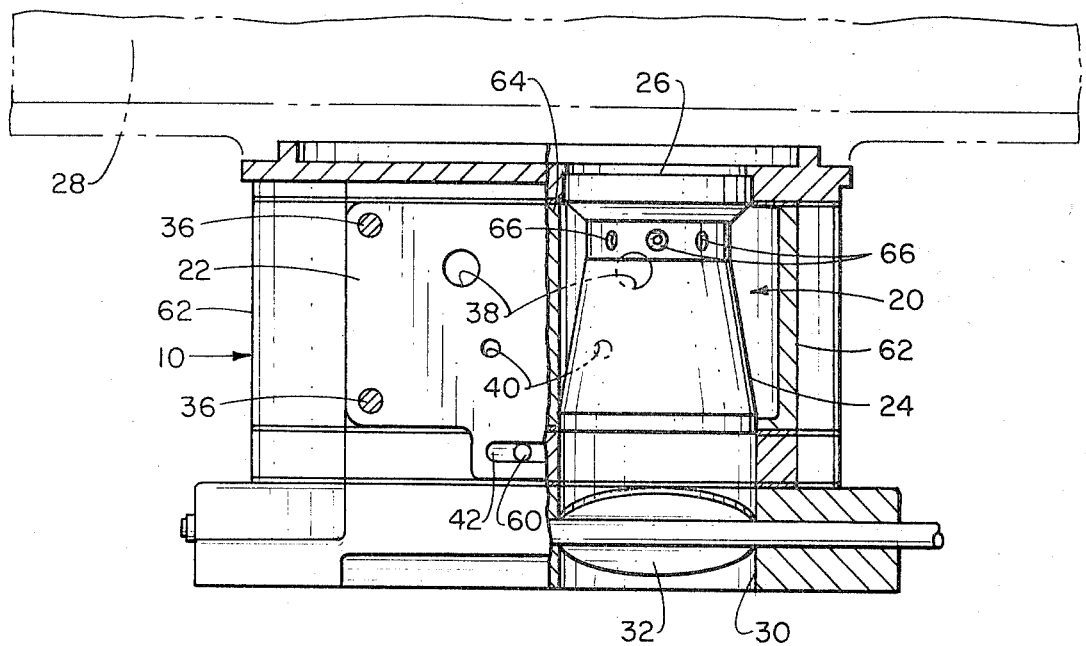
FIG. 4 is a vertical sectional view with the air cleaner removed and partially shown in phantom lines looking in the direction of the arrows 4—4 in FIG. 2.

As may be particularly seen in FIGS. 3 and 4, each of the venturi fuel inlet chambers 20 annularly surrounds its particular venturi 24 and outer main body walls 62 forming the transverse outer limits of the venturi fuel inlet chambers are spaced transversely outwardly from the venturis 24 throughout a major portion of the vertical or longitudinal lengths of the venturis. With the carburetor shown being a "two barrel" or "two venturi" carburetor, the two venturi fuel inlet chambers 20 are transversely separated by a partition 64 and the same transverse spacing between this partition and the outer extremeties of the venturis 24 is true as is clearly shown in FIG. 4. Thus, with the outward transverse spacing of the outer main body walls 62 and partition 64 from the venturis 24, and the large axial extent of the venturi fuel inlet chambers 20 along the venturis, spacious venturi fuel inlet chambers are provided for the venturis having volumes both transversely and axially far greater than that required to supply the venturis with normal gaseous fuel flows under any of the operating conditions of the particular engine so as to always maintain a large reserve supply of gaseous fuel and insuring that a fuel starving situation can never occur.

Each of the venturis 24, as previously stated, is generally of usual construction and form, and a series of equally circumferentially spaced venturi fuel orifices or nozzles 66 are formed transversely through the particular venturi at venturi throat 68 thereof communicating between the venturi fuel inlet chamber 20 into the interior of the venturi. These venturi fuel nozzles 66 are exactly matched proportionally in size to the size of the venturis 24. Furthermore, it is again seen that the total sum of the venturi fuel nozzles 66 of either of the venturis 24, whether considered in area or volume, and although exactly proprotional to the venturi sizes, is only a minute fraction of the total volumes of the venturi fuel inlet chambers 20, that is, the total possible fuel flow through the venturi fuel nozzles is far less than the volume of gaseous fuel that can be contained in the venturi fuel inlet chambers so that these venturi fuel nozzles will always be properly supplied from the venturi fuel inlet chambers with a large reserve of gaseous fuel still contained within such chambers. Furthermore, with the venturi fuel inlet chambers 20 being annular and relatively transversely spacious throughout their annular extents, each of the venturi fuel nozzles 66 is insured full flow gaseous fuel supply from the chambers without restriction other than that caused by the venturi fuel nozzles themselves.

In operation, assume that the carburetor is mounted with the venturi air-fuel outlet 30 in communication with the fuel intake manifold system (not shown) of a typical gaseous fuel engine such as internal combustion engine, and that the engine is not operating, but is ready for starting. At this stage, there is no vacuum at the venturi air-fuel outlet 30 so that there is no vacuum in the vacuum line 60 of the vacuum actuated control valve 18 and the control spring 58 thereof is maintaining the valve plate 56 withdrawn from the fuel metering plate 22 so that both the main and auxiliary fuel orifices 38 and 40 are fully open to each of the venturi fuel inlet chambers 20 and their venturis 24. Turning the engine over with the usual starter (not shown) with the butterfly valve 32 open causes a low vacuum at the venturi air-fuel outlets 30 drawing air from the air cleaner or filter 28 through the venturis 24 creating the usual low pressure area at the venturi throat 68 and drawing gaseous fuel from the venturi fuel inlet chambers 20 and through the venturi fuel nozzles 66, down through the venturis and ultimately into the cylinders of the engine.

As soon as the engine starts and is permitted to assume idle speed, the vacuum at the venturi air-fuel outlet 30 from the manifold system becomes relatively high, which is immediately sensed by the vacuum line 60 of the vacuum actuated control valve 18 and overcomes the control spring 58 drawing the flexible diaphragm 50 inwardly and forcing the valve plate 56 inwardly against the fuel metering plate 22 to completely close and seal off the auxiliary fuel orifices 40. This reduces the gaseous fuel flow from the gaseous fuel inlet 12 through the inlet fuel metering chamber 16, through the fuel metering plate 22, through the venturi fuel inlet chambers 20 and into the venturis 24 through the venturi fuel nozzles 66. This reduced gaseous fuel flow is the correct amount for properly sustaining the engine operation under light load conditions so that the engine operates at maximum efficiency.

Under engine acceleration or other high load operation, above its normal cruising speeds, the vacuum from the engine manifold system sensed at the venturi air-fuel outlets 30 by the vacuum line 60 of the vacuum actuated control valve 18 drops below the determined force exerted on the flexible diaphragm 50 by the control spring 58 so that the flexible diaphragm is moved outwardly withdrawing the valve plate 56 from the auxiliary fuel orifices 40 of the fuel metering plate 22 permitting increased gaseous fuel flow necessary for the engine during acceleration or high speed operation. Furthermore, an immediate response to these increased engine demands for gaseous fuel may be made by the venturis 24 in view of the exact metering of the gaseous fuels through the main and auxiliary fuel orifices 38 and 40 of the fuel metering plate 22 and, more important, the fact that both the inlet fuel metering chamber and the venturi fuel inlet chambers 16 and 20 are all relatively spacious containing large reserves of gaseous fuel for being drawn in by the venturis through the venturi fuel nozzles 66 thereof. Once the engine reaches normal cruising speed under normal cruising conditions, the engine manifold system vacuum at the venturi air-fuel outlets 30 once again rises to a high level exceeding the determined force of the control spring 58 in the vacuum actuated control valve 18 as sensed by the vacuum line 60 so as to draw the flexible diaphragm 50 inwardly closing the valve plate 56 against the auxiliary fuel orifices 40 and reducing the gaseous fuel flow to the correct amount necessary to sustain the engine at this cruising speed as determined by the action of the venturis 24.

According to the present invention, therefore, a gaseous fuel carburetor is provided which includes both a unique improved fuel metering system and a unique improved fuel distribution system, both of which provide distinct advantages over the prior constructions and either of which may be relatively simply and advantageously incorporated in a gaseous fuel carburetor structure. In the preferred form of the fuel metering plate 22, this plate is selectively removable and installable so that the exact size main and auxiliary fuel orifices 38 and 40 may be provided for each of the venturi fuel inlet chambers 20 from the common inlet fuel metering chamber 16 particularly suited and of exact size for a particular engine upon which the carburetor is installed. Furthermore, with the spacious common inlet fuel metering chamber 16 and the spacious venturi fuel inlet chambers 20 which surround the venturis 24, large gaseous fuel reserves are always provided to properly supply the engine and eliminate any possibilities of engine fuel starvation with the overall result being that the engine may operate at maximum efficiency under any operating conditions. With this maximum engine efficiency, the fact that an exact fuel metering plate 22 may be installed to exactly suit the particular engine and the fact that the main and auxiliary fuel orifices 38 and 40 of this fuel metering plate 22 are nonadjustable once determined and set, all present and future emission control standards for the particular engine may be met with this improved carburetor structure.

We claim:

1. In a carburetor for a gaseous fuel engine and the like; the combination of: a carburetor body; a venturi formed in said body having an air inlet, an intermediate throat and an air-fuel outlet; butterfly valve means in said venturi air-fuel outlet selectively operable between closed and various open positions for supplying an air-fuel mixture to an engine; fuel nozzle means at said venturi throat for directing fuel into said venturi; gaseous fuel inlet means for supplying fuel to said body; partition means in said body having a main fuel orifice of determined size therethrough and an auxiliary fuel orifice of determined size therethrough; fuel directing means operably connecting said gaseous fuel inlet means to said main fuel orifice and to said auxiliary fuel orifice and from said orifices to said fuel nozzle means of said venturi, said fuel directing means including an inlet fuel metering chamber having a wall thereof formed by said partition means with said main and auxiliary fuel orifices opening into said chamber for receiving fuel flow therefrom, vacuum actuated control valve means operably connected for sensing engine manifold vacuum and having a valve member movable between a closed position closing said auxiliary fuel orifice upon vacuum above a determined level being sensed and an open position opening said auxiliary fuel orifice upon said vacuum being sensed dropping below said determined level.

2. A carburetor for a gaseous fuel engine as defined in Claim 1 in which said partition means orifices are fixed size orifices through said partition means free of size adjustment.

3. A carburetor for a gaseous fuel engine as defined in Claim 1 in which said partition means includes a selectively removable orifice plate in said body having said main and auxiliary fuel orifices formed therethrough.

4. A carburetor for a gaseous fuel engine as defined in Claim 1 in which said partition means includes a selectively removable orifice plate in said body having said main and auxiliary fuel orifices formed therethrough of fixed size free of adjustment.

5. A carburetor for a gaseous fuel engine as defined in Claim 1 in which said fuel directing means includes a venturi fuel inlet chamber opening against said partition means between said partition means and said fuel nozzle means of said venturi, said venturi fuel inlet chamber being common to both said main and auxiliary fuel orifices.

6. A carburetor for a gaseous fuel engine as defined in Claim 1 in which said fuel directing means includes a venturi fuel inlet chamber opening against said partition means between said partition means and said fuel nozzle means of said venturi, said venturi fuel inlet chamber being common to both said main and auxiliary fuel orifices; and in which said main and auxiliary fuel orifices of said partition means are fixed size orifices through said partition means free of size adjustment.

7. A carburetor for a gaseous fuel engine as defined in Claim 1 in which said fuel directing means includes a venturi fuel inlet chamber opening against said partition means between said partition means and said fuel nozzle means of said venturi, said venturi fuel inlet chamber being common to both said main and auxiliary fuel orifices; and in which said partition means includes a selectively removable orifice plate between said inlet fuel metering chamber and said venturi fuel inlet chamber of said fuel directing means, said orifice plate having said main and auxiliary fuel orifices formed therethrough between said chambers.

8. A carburetor for a gaseous fuel engine as defined in Claim 1 in which said fuel directing means includes a venturi fuel inlet chamber opening against said partition means between said partition means and said fuel nozzle means of said venturi, said venturi fuel inlet chamber being common to both said main and auxiliary fuel orifices; and in which said partition means includes a selectively removable orifice plate between said inlet fuel metering chamber and said venturi fuel inlet chamber of said fuel directing means, said orifice plate having said main and auxiliary fuel orifices formed therethrough between said chambers, said main and auxiliary fuel orifices being fixed size orifices free of size adjustment.

9. A carburetor for a gaseous fuel engine as defined in Claim 1 in which said fuel directing means includes an annular venturi fuel inlet chamber surrounding said venturi opening against said partition means and connecting both said main and auxiliary fuel orifices to said fuel nozzle means, portions of said carburetor body forming radially outward limits of said venturi fuel inlet chamber spaced radially outwardly of said venturi at said fuel nozzle means; and in which said fuel nozzle means includes a series of circumferentially spaced openings through and into said venturi from said venturi fuel inlet chamber.

10. A carburetor for a gaseous fuel engine as defined in Claim 1 in which said fuel directing means includes a venturi fuel inlet chamber opening against said partition means between said partition means and said venturi common to both said main and auxiliary fuel orifices communicating therewith, said venturi fuel inlet chamber being annular and circumferentially surrounding said venturi at said fuel nozzle means and extedning axially of said venturi a major portion of said venturi, outer limits of said venturi fuel inlet chamber being formed spaced radially outwardly of said venturi by said carburetor body axially along said venturi; in which said fuel nozzle means includes a series of equally circumferentially spaced and equal size openings through and into said venturi from said venturi fuel inlet chamber; and in which said partition means includes a selectively removable orifice plate between said inlet fuel metering chamber and said venturi fuel inlet chamber, said orifice plate having said main and auxiliary fuel orifices formed therethrough as fixed size orifices free of size adjustment.

11. A carburetor for a gaseous fuel engine as defined in Claim 1 which said venturi is one of at least two venturis formed in said carburetor body each being generally the same and having said butterfly valve means and said fuel nozzle means; in which said partition means includes sets of said main and auxiliary fuel orifices for each of said venturis; in which said fuel directing means includes an inlet fuel metering chamber common to both said sets of orifices opening aganist said partition means and operably connecting said gaseous fuel inlet means to said orifices; in which said fuel directing means operably connects a different set of said orifices to each of said venturis and into said fuel nozzle means thereof; and in which said vacuum actuated control valve means has valve members thereof simultaneously movable between a closed position closing both said auxiliary fuel orifices upon vacuum above a determnied level being sensed and an. open position opening both said auxiliary fuel orifices upon said vacuum being sensed dropping below said determined level.

12. A carburetor for a gaseous fuel engine as defined in Claim 1 in which said venturi is one of at least two venturis formed in said carburetor body each being generally the same and having said butterfly valve means and said fuel nozzle means; in which said partition means includes sets of said main and auxiliary fuel orifices for each of said venturis; in which said fuel directing means includes an inlet fuel metering chamber common to both said sets of orifices opening against said partition means and operably connecting said gaseous fuel inlet means to said orifices; in which said fuel directing means operably connects a different set of said orifices to each of said venturis and into said fuel nozzle means thereof; in which said vacuum actuated control valve means has valve members thereof simultaneously movable between a closed position closing both said auxiliary fuel orifices upon vacuum above a determined level being sensed and an open position opening both said auxiliary fuel orifices upon said vacuum being sensed dropping below said determined level; and in which said partition means includes a selectively removable common orifice plate having said sets of main and auxiliary fuel orifices formed therethrough of fixed size free of adjustment.

References Cited
UNITED STATES PATENTS

| | | | |
|---|---|---|---|
| 2,965,462 | 12/1960 | Smith et al. | 48—180 |
| 3,539,313 | 11/1970 | Phipps | 48—184 |
| 3,317,196 | 5/1967 | Smith | 261—25 |

S. LEON BASHORE, Primary Examiner

P. F. KRATZ, Assistant Examiner

U.S. Cl. X.R.

48—184; 123—120; 261—23 A, 69 R